(12) United States Patent
Nonami (10) Patent No.: US 7,521,084 B2
(45) Date of Patent: Apr. 21, 2009

(54) METHOD FOR PRODUCING COMPOSITE CERAMIC MATERIAL

(75) Inventor: Toru Nonami, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 717 days.

(21) Appl. No.: 10/515,347

(22) PCT Filed: Jun. 5, 2003

(86) PCT No.: PCT/JP03/07134

§ 371 (c)(1),
(2), (4) Date: Dec. 3, 2004

(87) PCT Pub. No.: WO03/103834

PCT Pub. Date: Dec. 18, 2003

(65) Prior Publication Data

US 2005/0175788 A1   Aug. 11, 2005

(30) Foreign Application Priority Data

Jun. 5, 2002   (JP) ............................. 2002-164062

(51) Int. Cl.
 *B05D 7/00* (2006.01)
(52) U.S. Cl. .................... 427/212; 427/2.24; 427/2.26; 427/2.27; 427/430.1; 502/208; 502/350; 423/301
(58) Field of Classification Search ................. 427/337, 427/343, 444, 443.2, 212, 2.24, 2.26, 2.27, 427/430.1; 502/530, 208, 5, 159, 349, 350; 423/301; 522/28
See application file for complete search history.

(56) References Cited

U.S. PATENT DOCUMENTS 5,047,031 A * 9/1991 Constantz ..................... 606/77
6,090,736 A * 7/2000 Taoda et al. .................... 502/5

FOREIGN PATENT DOCUMENTS

JP          09175805     * 7/1997

OTHER PUBLICATIONS

Nonami, Toru et al. "Apatite Formation on TiO2, Photocatalyst Film in a pseudo Body Solution", Materials Research Bulletin, vol. 33, No. 1, pp. 125-131 1998.

* cited by examiner

*Primary Examiner*—Nadine G Norton
*Assistant Examiner*—Mahmoud Dahimene
(74) *Attorney, Agent, or Firm*—Oblon, Spivak, McClelland, Maier & Neustadt, P.C.

(57) ABSTRACT

The present invention provides a method for manufacturing a titanium dioxide photocatalyst composite material, and relates to a method for manufacturing a titanium dioxide composite ceramic material on which photoactive (photooxidative) apatite or another calcium phosphate monocrystal is partially deposited, wherein the method is characterized in promoting the following reactions by immersing titanium dioxide in an aqueous solution containing an excess of phosphorus ions and calcium ions in comparison with an artificial body fluid in order to fabricate a titanium dioxide photocatalyst composite material on which a compound composed of one or more apatite or other calcium phosphate $Ca_9(PO_4)_6$ monocrystals is partially deposited: (1) forming and aggregating calcium phosphate clusters and producing octacalcium phosphate; (2) converting the octacalcium phosphate into an apatite or other calcium phosphate $Ca_9(PO_4)_6$ monocrystal; and (3) growing the monocrystal.

16 Claims, 6 Drawing Sheets

METHOD FOR PRODUCING COMPOSITE CERAMIC MATERIAL

TECHNICAL FIELD

The present invention relates to a method for manufacturing a composite ceramic material, and more particularly relates to a method for manufacturing a titanium dioxide composite ceramic material provided with photoactivity (photooxidation ability) and high adsorption capacity and obtained by the partial deposition of apatite or another $Ca_9(PO_4)_6$ calcium phosphate crystal. The present invention is useful in providing a method for producing a novel composite ceramic photocatalytic material whereby a large amount of processing can be performed in a short time compared to a conventional method that uses artificial body fluid.

BACKGROUND ART

Aldehydes that evaporate from adhesives and the like contained in wallpaper and other construction materials, and ammonia and other chemical substances contained in tobacco smoke generally become causes of chemical hypersensitivity, atopy, and other maladies. Soiling of buildings and other structures due to atmospheric contamination and other factors brought about by automobile exhaust and the like damages the appearance of the buildings and causes construction materials to deteriorate.

Therefore, ceramic catalysts for adsorbing and decomposing oils and chemical substances such as aldehydes, ammonia, nitrogen oxides, and the like are being applied to metal, resin, and ceramic construction materials, and to interiors, exteriors, wallpaper, furniture, and the like. Work is also being conducted to develop metal, resin, and ceramic construction materials coated with ceramic catalysts, as well as buildings, interiors, exteriors, furniture, and other objects coated with such catalysts.

Exterior wall materials, automobiles, train cars, or other items that are used for long periods of time outdoors have particularly noticeable soiling by the atmosphere, marks from oils washed out by rain, and other types of contamination. These objects become contaminated after one or two months, they require regular washing, repainting, and other maintenance that leads to mounting costs, so materials are being sought that are maintenance-free and do not become contaminated. Marks from oily flows are particularly prominent under window frames and the like; for example, contamination is noticeable on the white tenting used in domed baseball stadiums and the like, and also on bullet trains and other train cars. This contamination is made up of carbon and other atmospheric dust that is fixed by oils, and is not easily removed by cleaning with detergents. Sick house syndrome or atopy is caused by formaldehyde, acetaldehyde, and other chemical substances emitted from construction materials or furniture. Additional examples include tobacco smoke as well as ammonia, hydrogen sulfide, methyl mercaptan, and other organic chemicals that cause pet odor from indoor dogs and the like.

Attempts have therefore been made to decompose harmful chemical substances by applying a coating containing titanium dioxide to wallpaper or interior materials, furniture, and the like. However, an organic binder cannot be used, and the coating does not function in the absence of light, so almost no effects are obtained at night or in a darkened room. There are also no examples of using such a photocatalyst inside an automobile or train car. An attempt has recently been made to use a visible light photocatalyst, but these visible light photocatalysts are also incapable of physical adsorption, so only substances that come in contact with the surface can be treated, and the effects remain inadequate even when these catalysts are applied to building materials. Furthermore, visible light-reactive photocatalysts have enhanced activity in the visible light region but extremely poor reactivity to light in the ultraviolet region.

According to its application, a coating generally takes on a yellow tinge and deteriorates over time after application due to finger marks and other oils, or due to decomposition and other processes brought about by adsorption of atmospheric moisture, oxidation, or light. Antioxidants are therefore admixed into the coating in order to enhance the durability of the coating film and to maintain its appearance. As an example of the background art, a technique has been proposed whereby a powder having photocatalyzing ability is included in a silica coating material (Japanese Laid-open Patent Application No. 8-259891). Titanium oxide, zirconium oxide, zinc oxide, strontium titanate, tin oxide, tungsten oxide, iron oxide, and bismuth oxide are cited in this publication as the types of powder having photocatalyzing ability, and examples thereof describe odor elimination, antibacterial effects, and the like as the effects obtained by including titanium oxide in a coating film.

Also proposed is a hydrophilic coating having a film that contains at least silica. The coating is formed on a film containing silica and an inorganic substance that has a mean particle diameter of 5 µm or less and is selected from the group that includes titanium dioxide, chromium oxide, and iron oxide (Japanese Laid-open Patent Application No. 5-305691). A photocatalytic hydrophilic covering film is also proposed that contains silica and a photocatalytic material selected from the group that includes $TiO_2$, ZnO, $SnO_2$, $SrTiO_3$, $WO_3$, $Bi_2O_3$, and $Fe_2O_3$ (International Publication No. WO96/29375). There is also a photocatalytic hydrophilic coating composition that is composed of crystalline titanium oxide particles, tungsten chloride, and a solution containing tetrahydrofuran (Japanese Laid-open Patent Application No. 10-237357).

Also proposed is a water-repellent material that is designed to form a hydrophobic surface and contains titanium oxide or other photocatalytic oxide particles, silicone, and a water-repellent fluororesin (Japanese Laid-open Patent Application No. 10-237431). A particulate photocatalyst in which an inactive ceramic as a photocatalyst is supported in strips on the surfaces of titania particles is also proposed as a photocatalyst particle, together with a manufacturing method thereof (Japanese Patent No. 282342). However, depending on the manner in which the catalysts are used, the odor-eliminating, antibacterial, and other effects are sometimes inadequate even when these conventional photocatalysts are included in the coating film, and there is also demand for development of a coating having high durability and ability to maintain a pleasing appearance for a long time. When an organic coating material is used as a component of a coating material, there are also drawbacks whereby the coating film deteriorates due to the organic coating material component coming into direct contact with $TiO_2$ and the like.

Because of its strong photocatalytic activity, titanium dioxide has drawbacks in that the catalyst itself breaks down and causes discoloration, peeling, and crumbling when mixed with an organic binder and applied to paper or resin. There has conventionally been no alternative but to perform a so-called double application whereby a coating material is formed using an inorganic binder, and the coating material containing the titanium dioxide powder is applied as a top coat or the like after an undercoat has been applied, which takes two or more days to complete and is impractical, particularly in roadside building or in soundproofing walls for expressways. Such coating has only been possible on tile or other ceramic walls or metal. Making a surface hydrophilic to prevent contamination using an organic coating material and other methods have been investigated, but adequate stain-proofing effects have so far been unobtainable.

In view of such drawbacks, titanium dioxide powder coated with apatite or another calcium phosphate or a coating material has been proposed (Japanese Laid-open Patent Application No. 10-244166). Apatite is an excellent physical adsorbent with respect to protein, aldehydes, and the like, so it is capable of adsorbing substances even when there is no light present. Furthermore, this composite material is coated with apatite, so the titanium dioxide does not come in direct contact with the organic binder. As a result, the binder does not decompose even when struck by light, it becomes possible to use an organic paint, and other weaknesses of the photocatalyst are overcome. In this method, however, artificial body fluid is used; it is impossible to create apatite in the desired shape, such as a rod shape or hexagonal column; and production time or productivity is inadequate.

As a result of repeated and intense investigation conducted under these circumstances and aimed at fundamentally overcoming current photocatalyst drawbacks such as those described above, the inventors succeeded in developing a method for manufacturing a titanium dioxide photocatalyst composite material on which a compound composed of one or more apatite or other $Ca_9(PO_4)_6$ calcium phosphate crystals is partially deposited by immersing titanium dioxide in an aqueous solution containing an excess of phosphorus ions and calcium ions in comparison with an artificial body fluid. As a result it became possible to manufacture a titanium dioxide photocatalyst composite material on which a compound composed of one or more units of $Ca_9(PO_4)_6$ is partially deposited, in which the precipitated crystals are shaped as rods or hexagonal columns, which has excellent adsorption capacity and photoactivity (photooxidation ability), and whose specific surface area is 5 m$^2$/g or higher.

SUMMARY OF THE INVENTION

The present invention provides a method for manufacturing a titanium dioxide photocatalyst composite material.

The present invention relates to a method for manufacturing a titanium dioxide composite ceramic material on which photoactive (photooxidative) apatite or other calcium phosphate monocrystals are partially deposited, and particularly relates to a method for manufacturing the abovementioned titanium dioxide composite ceramic material characterized in promoting the following reactions by immersing titanium dioxide in an aqueous solution containing an excess of phosphorus ions and calcium ions in comparison with an artificial body fluid in order to fabricate a titanium dioxide photocatalyst composite material on which a compound composed of one or more units of $Ca_9(PO_4)_6$ is partially deposited: (1) forming and aggregating calcium phosphate clusters and producing octacalcium phosphate; (2) converting the octacalcium phosphate into an apatite monocrystal or other $Ca_9(PO_4)_6$ calcium phosphate monocrystal; and (3) growing the monocrystal.

DISCLOSURE OF THE INVENTION

An object of the present invention is to provide a method whereby the shape, size, and quantity of precipitated apatite or other calcium phosphate monocrystal can be arbitrarily controlled, and which is simple compared to a conventional method that involves the use of an artificial body fluid used for manufacturing the apatite used in artificial bones.

Another object of the present invention is to provide a method for manufacturing the abovementioned composite ceramic material, which has high activity compared to a usual compound composed of phosphorus and calcium, which can be used as an environmental decontamination material or the like, in which the precipitated rod-shaped or hexagonal apatite or other calcium phosphate compound has much higher activity compared to a plate- or ribbon-shaped compound composed of phosphorus and calcium and obtained by the conventional method from artificial body fluid, and which can deliver adequate photoactivity as an environmental decontamination material.

The present invention for overcoming the abovementioned drawbacks is constituted by the following technological means.

(1) A method for manufacturing a titanium dioxide composite ceramic material on which photoactive (photooxidative) apatite or another calcium phosphate monocrystal is partially deposited, wherein the method is characterized in promoting the following reactions by immersing titanium dioxide in an aqueous solution containing an excess of phosphorus ions and calcium ions in comparison with an artificial body fluid in order to fabricate a titanium dioxide photocatalyst composite material on which a compound composed of one or more apatite or other calcium phosphate. $Ca_9(PO_4)_6$ monocrystals is partially deposited:

(a) forming and aggregating calcium phosphate clusters and producing octacalcium phosphate;

(b) converting the octacalcium phosphate into an apatite monocrystal or other calcium phosphate $Ca_9(PO_4)_6$ monocrystal; and (c) growing the monocrystal.

(2) The method described in (1), wherein the monocrystal is shaped as a rod or a hexagonal column and has excellent adsorption capacity.

(3) The method described in (1), wherein the apatite or other calcium phosphate monocrystal having photooxidation ability is apatite with a size in the nanometer to submicron range.

(4) The method described in (1), for fabricating a titanium dioxide photocatalyst composite material on which one or more units of $Ca_9(PO_4)_6$ having a specific surface area of 5 m$^2$/g or more are partially deposited.

(5) The method described in (1), wherein the aqueous solution containing phosphorus ions and calcium ions contains 200 to 3000 mM of Na$^+$, 30 to 80 mM of K$^+$, 60 to 2000 mM of Ca$^+$, 1 to 40 mM of Mg$_{2+}$, 150 to 3000 mM of Cl$^-$, 40 to 240 mM of HCO$^{3-}$, and 30 to 300 mM of HPO$_4^{2-}$.

(6) The method described in (1), wherein the aqueous solution containing phosphorus ions and calcium ions contains 30 to 80 mM of K$^+$, 60 to 2000 mM of Ca$^+$, 1 to 40 mM of Mg$^{2+}$, 150 to 3000 mM of Cl$^-$, 40 to 240 mM of HCO$^{3-}$, and 30 to 300 mM of HPO$_4^{2-}$.

(7) The method described in (1), wherein the apatite or other calcium phosphate monocrystal is elongated in direction of the c axis and has a maximum lattice interval of 8.2 Å±20%.

(8) The method described in (5) or (6), wherein the concentration of Ca ions in the aqueous solution is 200 to 1500 mM, and the concentration of P ions is 50 to 200 mM.

(9) The method described in (1), (5), or (6), wherein the aqueous solution contains Zn, Fe, Ag, Ca, or Pt in a concentration of 0.1 µm or higher.

(10) The method described in (1), wherein the shape and size of the monocrystal are controlled by adding a large quantity of water or alcohol to the aqueous solution, and controlling the progress of the reaction.

(11) The method described in (1), wherein the exposed surface area of the titanium dioxide is 40% or higher.

In the present invention, a titanium dioxide photocatalyst composite material on which a compound composed of one or more apatite or other calcium phosphate $Ca_9(PO_4)_6$ monocrystals is partially deposited is fabricated by immersing titanium dioxide in an aqueous solution containing an excess of phosphorus ions and calcium ions in comparison with an artificial body fluid. In a specific case, titanium dioxide is mixed with an aqueous solution containing positive ions such as calcium, iron, zinc ions, or other ions; and is mixed with an aqueous solution containing a negative ion, yielding titanium dioxide in which calcium phosphate is precipitated on the surface thereof. When the positive ion solution is mixed with the negative ion solution, innumerable calcium phosphate clusters are immediately produced and aggregated on the surface of the titanium dioxide. In this case, it is preferable that the neutrality of the solution be maintained, and that the temperature be about 20° C. to 40° C. Easily produced octacalcium phosphate is preferentially produced in a stable manner in this region. Apatite is usually not directly produced unless conditions are more alkaline and hotter. The octocalcium phosphate thus produced is eventually converted to apatite by supplying additional calcium. The converted apatite exhibits a plate or ribbon shape, which is the automorph of octocalcium phosphate. The supply of calcium is insufficient in artificial body fluid, and the reaction therein stops at this point.

However, in the solution of the present invention, calcium and phosphorus are in adequate supply, so their supply continues even after conversion to apatite, and a plate shape grows and approaches the rod shape or hexagonal column shape as the natural shape of apatite. In the solution of the present invention, the supply of calcium and the like is extremely prompt, so these continuous reactions take place extremely rapidly, and are almost instantaneous. The reactions usually occur in 0.1 to 10 seconds. The reactions progress rapidly when left alone, and apatite of a size larger than necessary is formed, so a large quantity of water or alcohol is added between ten seconds and one minute thereafter and the reaction is stopped. Apatite is thereby obtained having a size in the nanometer to submicron range. The reaction is continued from ten minutes to one hour or longer when large apatite of 10 microns or more is desired.

A particular characteristic of this reaction is that a large quantity of treatment is possible compared to a method that uses artificial body fluid. About one to ten grams of titanium dioxide is typically reacted per liter of artificial body fluid, but 100 to 1000 times this amount of treatment can be performed by the present invention. For example, 1 g of titanium dioxide can be thoroughly treated per 1 mL of aqueous solution.

The calcium phosphate thus precipitated is composed of fine monocrystals of octacalcium phosphate, tricalcium phosphate, apatite (fluoroapatite or hydroxyapatite), or the like containing one or more $Ca_9(PO_4)_6$ as the smallest units. The monocrystal may be composed solely of a collection of $Ca_9(PO_4)_6$, or may simultaneously contain OH, F, Cl, or the like. Part of the Ca may be Cr, Fe, or another metal; and part of the P may be Ti, Al, or the like. These may be crystals or noncrystals. In the case of crystals, the calcium phosphate crystals may be apatite or tricalcium phosphate, octocalcium phosphate, or the like. The apatite is hydroxyapatite, fluoroapatite, or the like.

The compound titanium dioxide photocatalyst composed of one or more units of $Ca_9(PO_4)_6$ may be anatase-type or rutile-type, and must have photocatalytic activity. The particle diameter thereof is from 1 nm to several mm. The shape thereof may be that of a powder or thin film. For example, the titanium dioxide may be activated by visible light through creation of oxygen deficiency by plasma treatment or baking in a nitrogen atmosphere, or may be titanium oxide that is doped with metal ions derived from a metal compound. One or more units of $Ca_9(PO_4)_6$ must be attached to the surface of these photocatalysts. This attachment may be in one location, scattered in several locations, or dispersed in bands. It is also possible to superimpose a plurality of $Ca_9(PO_4)_6$ and to form a crystalline phase.

The most preferred compound composed of one or more units of $Ca_9(PO_4)_6$ is produced from an aqueous solution containing at least phosphorus and calcium. Specifically, $Ca_9(PO_4)_6$ clusters are formed in an aqueous solution by controlling the composition of the solution, the product is collected, and the abovementioned compound is produced. If the treated substance to be coated with titanium dioxide powder or another compound composed of one or more units of $Ca_9(PO_4)_6$ is first dispersed, suspended, or immersed in the aqueous solution, a compound composed of one or more units of $Ca_9(PO_4)_6$ is deposited on the surface of the compound. There may be one or a plurality of these units. In the case of a plurality of units, the resulting compound is composed of one or more units of noncrystalline or crystalline $Ca_9(PO_4)_6$. This compound is apatite, tricalcium phosphate, or the like, but essentially may be any compound. The abovementioned $Ca_9(PO_4)_6$ has excellent adsorbency of substances, microbes, viruses, aldehydes, ammonia, and other harmful substances.

The size of the compound composed of one or more units of $Ca_9(PO_4)_6$ is preferably 0.01 nm to 50 μm. A size of 0.1 nm to 10 μm is more preferred. The shape of the crystal formed by the method of the present invention includes a rod shape or hexagonal column shape that is unobtainable by the conventional method that uses artificial body fluid. Monocrystalline apatite having these shapes has a wide surface orthogonal to the direction of growth and excellent adsorbency of substances, particularly aldehydes or microbes. Specifically, the conventional plate-shaped, ribbon-shaped, or porous apatite had a small end face area and inadequate adsorbency. In the present invention, this end face area can be enlarged by lengthening the time during which the titanium dioxide is immersed in the aqueous solution and by increasing the concentration of the solution composition.

In the present invention, the abovementioned aqueous solution containing phosphorus ions and calcium ions preferably contains 200 to 3000 mM, and more preferably 500 to 2000 mM, of $Na^+$; 30 to 80 mM, and more preferably 30 to 50 mM, of $K^+$; 60 to 2000 mM, and more preferably 200 to 1500 mM, of $Ca^+$; 1 to 40 mM, and more preferably 1 to 20 mM, of $Mg^{2+}$; 150 to 3000 mM, and more preferably 200 to 2000 mM, of $Cl^-$; 40 to 240 mM, and more preferably 40 to 150 mM, of $HCO_3^-$; and 30 to 300 mM, and more preferably 50 to 200 mM, of $HPO_4^{2-}$.

From 1 to 99% of the surface of the titanium dioxide is preferably coated with the compound composed of one or more units of $Ca_9(PO_4)_6$. If a substance to be treated is not placed in the aqueous solution, the $Ca_9(PO_4)_6$ clusters produced in the aqueous solution collect together and a compound is formed. The abovementioned aqueous solution may contain Na, K, Cl, Ca, P, Mg, and other ions, for example. A solution with a pH of 7 to 8 is suitable, and a pH of 7.2 to 7.6 is preferred. A phosphoric acid buffer solution is preferred, but a tris buffer solution is more preferably used. The immersion time is one second to 24 hours, but 5 to 30 minutes is preferred.

The form of the compound composed of one or more units of $Ca_9(PO_4)_6$ is not particularly limited, and various forms thereof are possible. For example, the compound composed of one or more units of $Ca_9(PO_4)_6$ may be in the form of layers, minute fragments, or microparticles. However, the end faces thereof are most preferably wide and are shaped as rods, hexagonal columns, or hexagonal plates for the sake of physical adsorbency. The form of the compound may be any of either one in which a coating layer of the compound composed of one or more units of $Ca_9(PO_4)_6$ is formed on a portion of the surface of the titanium oxide, or one in which a portion of the surface of the titanium oxide is coated with a precipitated compound composed of one or more units of $Ca_9(PO_4)_6$ in the form of minute fragments or microparticles. A form in which the compound composed of one or more units of microparticulate $Ca_9(PO_4)_6$ is uniformly scattered on the surface of the titanium oxide is most preferred, and the coverage ratio in this case is 20% or lower; for example, about 0.1 to 10%.

These compounds composed of one or more units of $Ca_9(PO_4)_6$ produced in the aqueous solution have weak photo-oxidation ability (photocatalyzing ability). A metal ion or the like can be introduced into this compound to yield a compound of the general formula $A_x(BO_y)_zX$. In the above formula, A is a Ca, Co, Ni, Cu, Al, La, Cr, Fe, Mg, or another metal atom; B is a P, S, or another atom; and X is a hydroxyl group (—OH), a halogen atom (F or Cl, for example), or the like. Examples of this type of calcium phosphate include apatite, hydroxyapatite, fluoroapatite, chlorapatite, tricalcium phosphate, calcium hydrogen phosphate, and the like. An apatite that can be suitable for use in an embodiment of the present invention is a hydroxyapatite or fluoroapatite in which X in the formula above is a hydroxyl group or fluorine atom, and more preferably a $Ca_{10}(PO_4)_6(OH)_2$ apatite crystal in which X in the above formula is a hydroxyl group and A is calcium (Ca). Furthermore, a portion thereof may be substituted with Co, Ni, Cu, Al, La, Cr, Fe, Mg, or the like.

The abovementioned compound is capable of adsorbing a large quantity of microbes, viruses, aldehydes, ammonia, and other odor components or causes of chemical hypersensitivity syndrome, so these harmful substances can be adsorbed without the presence of light, and environmental decontamination or self-cleaning effects can be obtained.

Conditions must be appropriate for generating the abovementioned compound. The temperature is 20° C. to 60° C. If the temperature is lower than this, it takes time to produce the compound composed of one or more units of $Ca_9(PO_4)_6$, and sometimes this compound cannot be produced at all. The particle diameter is preferably 0.01 nm to 50 μm. A more preferred particle diameter is 0.1 nm to 10 μm. The titanium dioxide photocatalyst on which a compound composed of one or more units of $Ca_9(PO_4)_6$ is partially deposited can be used for environmental decontamination or self-cleaning effects by being applied to construction materials or buildings, interior materials, exterior materials, furniture, and the like, for example.

An ion absorption layer forms on the surface of $Ca_9(PO_4)_6$ in the presence of water, and various harmful substances are adsorbed or decomposed by the ion exchange of calcium or phosphorus with various metal ions; specifically, magnesium, aluminum, iron, sulfur, chromium, fluorine, chlorine, and the like. Consequently, this compound is preferably used in the presence of water. Only a small quantity of water is needed, and an atmospheric moisture content of 5% or higher is usually sufficient as an alternative to an aqueous solution. When applied to exterior walls, automobiles, or the outsides of train cars, the product is capable of preventing adherence of contamination from oils and the like in the atmosphere. These items can thereby continue to be used without ever being contaminated.

Furthermore, when the invention is used to remove microbes, mildew, and harmful chemical substances such as aldehydes and ammonia in the interiors of buildings, automobiles, or trains, these substances require higher absorptive ability, so it is effective to increase the content of the compound composed of one or more units of $Ca_9(PO_4)_6$. The compound composed of one or more units of $Ca_9(PO_4)_6$ has the ability to adsorb microbes, viruses, chemical substances, or the like, so the action of the compound composed of one or more units of $Ca_9(PO_4)_6$ becomes particularly critical in locations where light does not reach, since titanium dioxide and other photocatalysts have no effect.

Environmental decontamination or self-cleaning effects can be obtained with respect to interior construction materials composed of paper, fibers, resin, timber, ceramics, and metal for wallpaper, building materials, ceilings, flooring, sofas, tables, chairs, sliding doors, sliding screens, doors, household appliances, bookcases, and other furniture; tile, timber, metal, ceramics, resins, and other exterior materials; fibers, resins, paper, ceramics such as tile, metals, and wood in chairs and flooring inside the compartments of automobiles such as private vehicles, taxis, and buses, as well as in trains, airplanes, boats, and the like; and also fibers, resins, paper, tile, and other ceramic, metal, wood, and other exterior materials to which these compounds are applied. Application of the coating may be performed by any method. Unmodified powder may be sprayed thereon, and the product may also be dissolved in water or the like and applied.

Adhesion is enhanced if the product is mixed into an organic binder or inorganic binder and deposited. The coating usually suffers discoloration and crumbles due to titanium dioxide decomposing the inorganic binder itself when mixed into the binder, but with titanium dioxide on which a compound composed of one or more units of $Ca_9(PO_4)_6$ is partially deposited, the titanium dioxide and the binder do not come into direct contact with each other, so these problems are absent even when an organic binder is used. Any publicly known water-based or solvent-based organic coating material or inorganic coating material may be used as the coating material component in the present invention. For example, water-based organic coating materials include vinyl synthetic resin emulsions. Vinyl synthetic resins are not particularly limited, and may be any polymers of emulsion-polymerizable vinyl monomers. Examples thereof include acrylic resin, acrylic copolymer resin, styrene copolymer resin, vinyl acetate resin, vinyl acetate copolymer resin, ethylene-vinyl acetate copolymer resin, and the like. Among these resins, a resin that is soluble in a solvent can be used as a solvent-based organic coating material.

A solution containing a hydrolysis-polymerizable metal alkoxide for forming a coating film by a sol-gel method is included as an inorganic coating material used in the present invention. The metal of the metal alkoxide is not particularly limited, and examples thereof include Al, Ti, Zr, Si, and the like. Among these metals, Al and Si are preferred, and Si is particularly preferred. Besides water, an appropriate inorganic solvent can be used when fabricating the inorganic coating material. Examples of such organic solvents include. methanol, ethanol, propanol, isopropanol, butanol, and other alcohols; and diethyl ether, dioxane, dimethoxy ethane, tetrahydrofuran, and other ethers, as well as N-methyl pyrrolidone, acetonitrile, dimethyl formamide, dimethyl acetamide, dimethyl sulfoxide, acetone, benzene, and the like. A mixture of these solvents may also be used.

In the abovementioned coating material composition, a photocatalyst partially coated with the compound composed of one or more units of $Ca_9(PO_4)_6$ is contained in a solids weight ratio of generally 1 to 50 wt %, and preferably 5 to 30 wt %, with respect to the organic or inorganic coating material. The photocatalytic effects are reduced if the mixing ratio is less than 1 wt %, and the cost increases if the mixing ratio is more than 50 wt %. The mixing ratio varies according to the type of coating material, but may be appropriately determined by the manufacturer with consideration for photocatalyzing effects and cost.

A film-forming auxiliary may be used in the abovementioned admixture. An antifoaming agent, thickening agent, freezing stabilizer, wetting agent, pigment, water-soluble resin, permeation auxiliary, or other known additive may also be admixed as needed in the coating composition. The coating object may be coated with the composition by brushing, rolling, air spraying, airless spraying, and other usual methods. In the abovementioned coating composition, a portion of the surface of the titanium oxide contains a photocatalyst coated with a compound composed of one or more units of $Ca_9(PO_4)_6$, so the occurrence of such effects as yellowing and degradation by adsorption of oils or moisture becomes extremely low in the coating film thus obtained, and the coating film is highly durable and preserves its beautify appearance. The coating film is also stable because it is difficult for the organic coating material component to come into direct contact with the $TiO_2$ even when an organic coating material is used as the coating material component.

The ceramic catalyst of the present invention is a titanium dioxide or another photocatalyst that reacts in visible light and has calcium phosphate having excellent adsorption capacity; particularly, a compound composed of one or more units of apatite or other $Ca_9(PO_4)_6$ calcium phosphate monocrystals, coated or precipitated onto the surface thereof, and is manufactured by immersing titanium dioxide in an aqueous solution composed of phosphorus and calcium. The precipitated apatite or other calcium phosphate is composed of minute monocrystals, and by this manufacturing method, rod-shaped or hexagonal columnar apatite unobtainable by the conventional method using artificial body fluid can be precipitated in a large quantity in a short time. Apatite having such a shape has excellent adsorbance of substances, particularly microbes and the like, and has excellent properties that were heretofore unobtainable.

BEST MODE FOR CARRYING OUT THE INVENTION

The present invention will next be described in detail based on examples, but the present invention is not limited by these examples. "Parts" as used hereinafter refers to weight parts unless otherwise specified.

REFERENCE EXAMPLE

In the present reference example, a photocatalyst was prepared that was partially coated with a compound composed of one or more units of $Ca_9(PO_4)_6$ by using artificial body fluid.

2 g of anatase-type titanium oxide (manufactured by Tayca Corporation) were suspended in one liter of artificial body fluid and left for two hours at 37° C., and then the product was dried at 100° C. The artificial body fluid contained 8000 mg of sodium chloride, 200 mg of potassium chloride, 1150 mg of sodium monohydrogen phosphate, 200 mg of potassium dihydrogen phosphate, and 200 mg of calcium chloride in one liter of water. A photocatalyst was thus obtained in which a portion of the surface of titanium oxide particles (approximately 2%: from observation with electron microscope) was coated with a compound composed of one or more units of $Ca_9(PO_4)_6$. The shape of the apatite was an aggregation of plate crystals.

Example 1

(1) Manufacturing Method

Process (1)

900 mg of $CaCl_2$ were dissolved in 1 mL of water (solution 1).

3 mL of 1 L of an aqueous solution containing 1450 mM of $Na^+$, 42 mM of $K^+$, 1410 mM of $Cl^-$, 80 mM of $HCO_3^{3-}$, and 95 mM of $HPO_4^-$ were added to the solution 1 above (solution 2).

1 g of $TiO_2$ (anatase 15 nm) was added to this solution and stirred vigorously.

Process (2)

The solution to which water (50 mL) was immediately added was centrifuged for three minutes at 3000 rpm, and the supernatant was discarded.

The addition of water and the centrifugation were repeated to remove the ions in the fluid.

(2) Results

Figure 1:
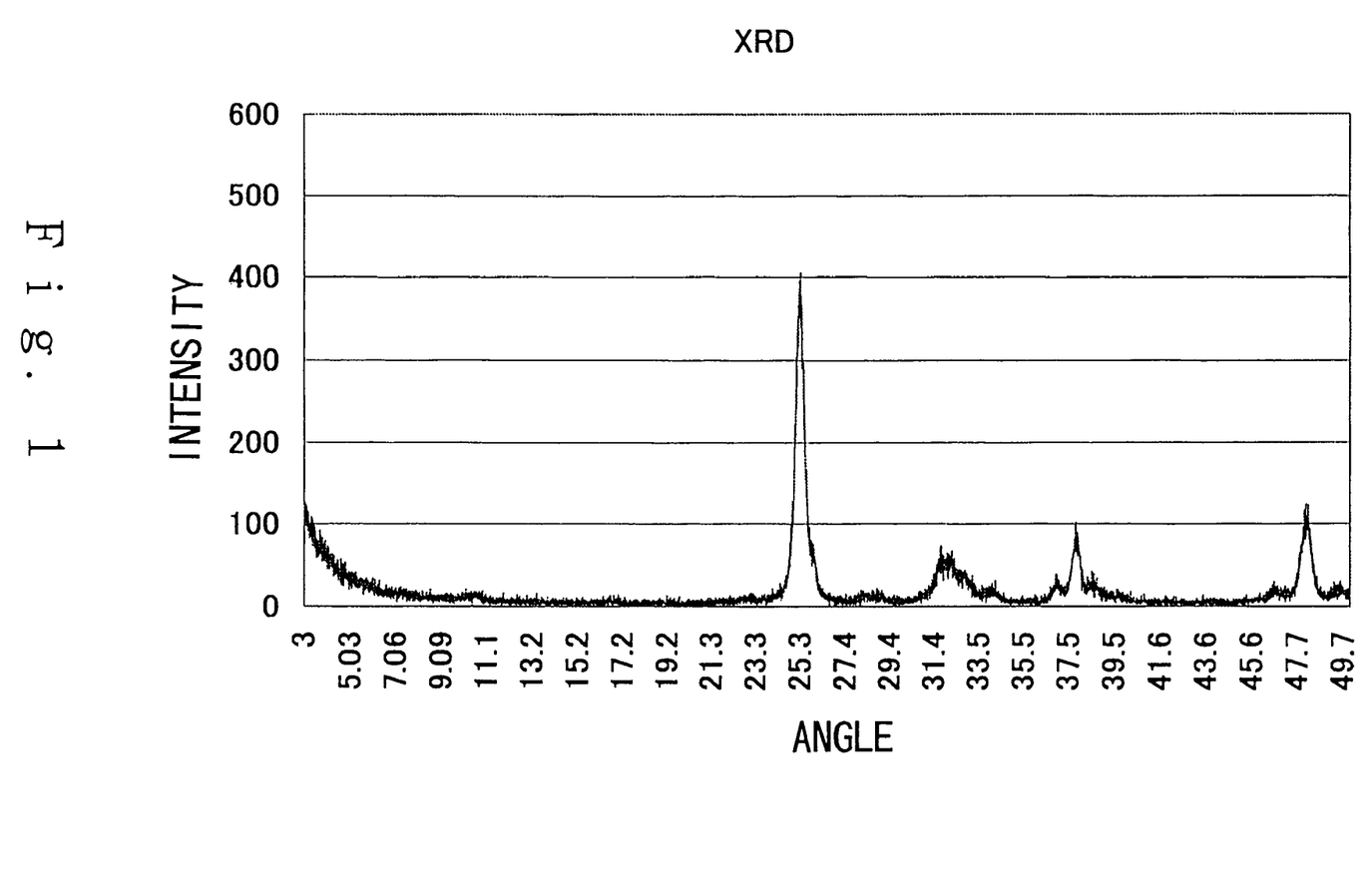
FIG. 1 shows the X-ray diffraction of a precipitated crystal.
Figure 2:
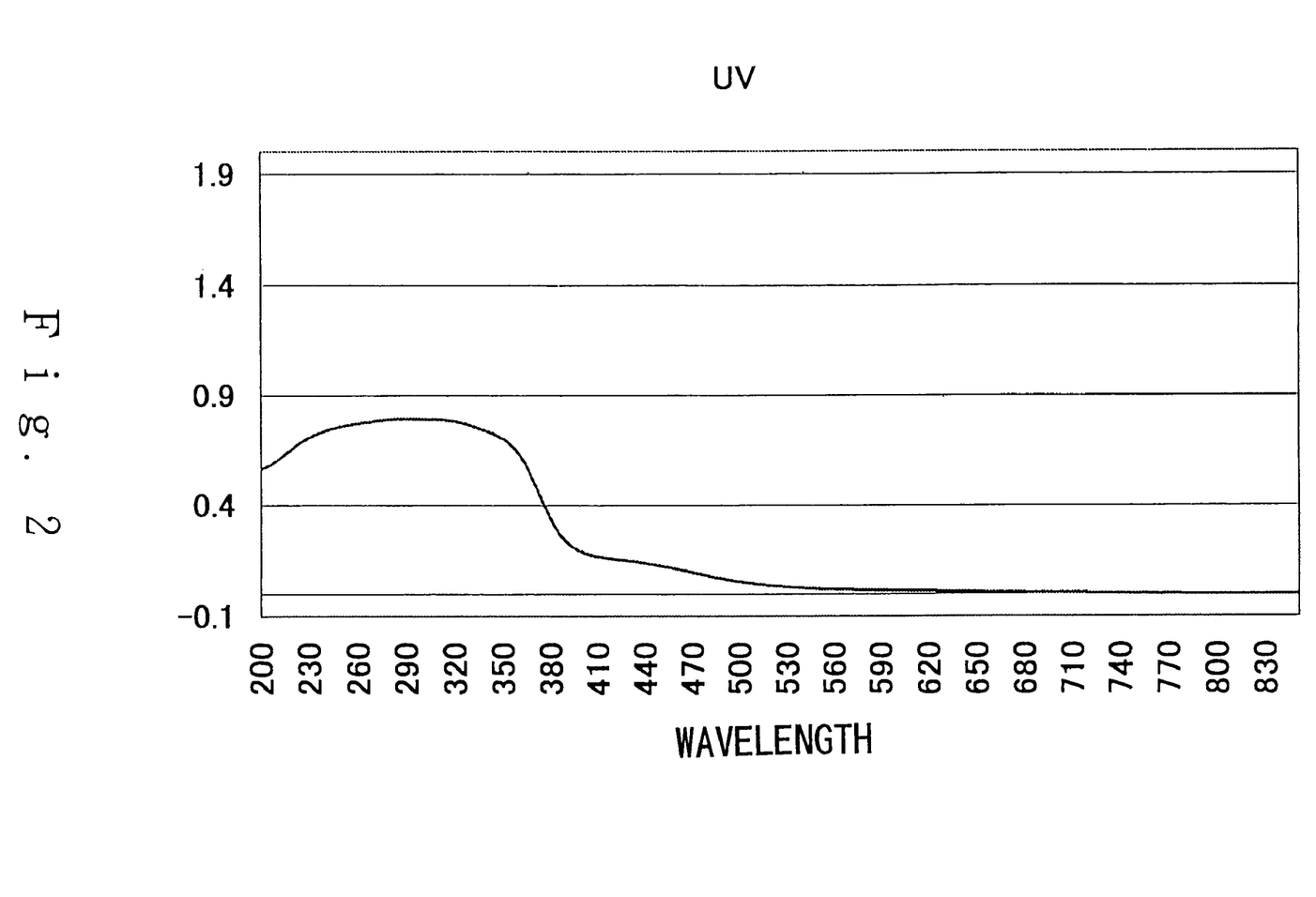
FIG. 2 shows the UV to visible absorption spectrum of the precipitated crystal.
Figure 3:
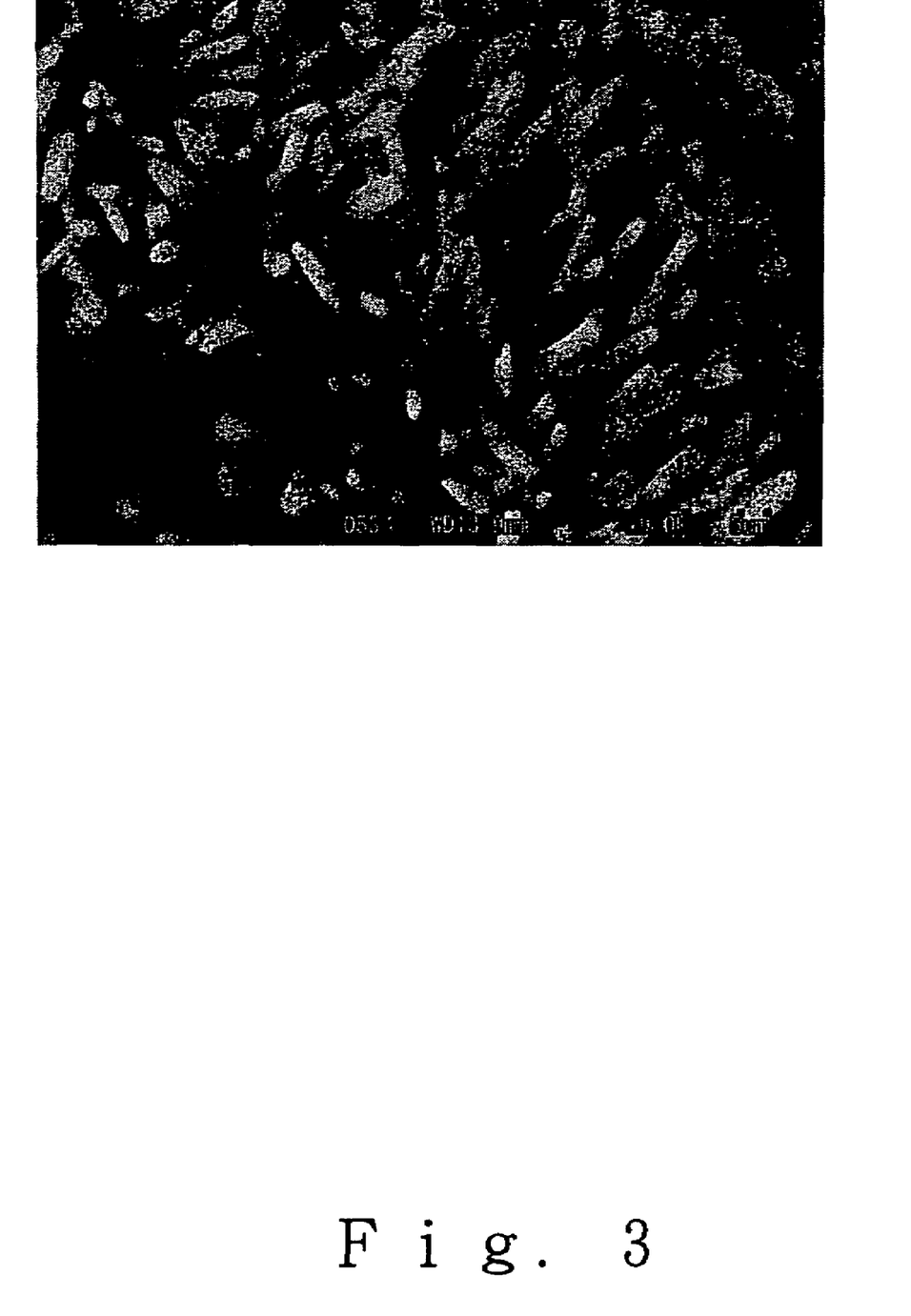
FIG. 3 shows an electron micrograph of the precipitated crystal.

FIG. 1 shows the X-ray diffraction (after apatite precipitation) and FIG. 2 shows the UV to visible absorption spectrum (after apatite precipitation). FIG. 3 shows an electron micrograph. As is clear from these data, the precipitated crystal was apatite having a rod shape.

Example 2

(1) Manufacturing Method

Process (1)

60 mg of $CaCl_2$ and 10 mg of zinc nitrate were dissolved in 1 mL of water (solution 1).

3 mL of 1 L of an aqueous solution containing 42 mM of $K^+$, 80 mM of $HCO_3^{3-}$, and 95 mM of $HPO_4^-$ were added to solution 1 above (solution 2).

1 g of $TiO_2$ (anatase 6 nm) was added to this solution and stirred vigorously.

Process (2)

The solution to which water (50 mL) was immediately added was centrifuged for three minutes at 3000 rpm, and the supernatant was discarded.

The addition of water and the centrifugation were repeated to remove the ions in the fluid.

The precipitated crystal was apatite having a rod shape the same as in Example 1 above.

Example 3

(1) Manufacturing Method

Process (1)

1500 mg of $CaCl_2$ were dissolved in 1 mL of water (solution 1).

1 g of $TiO_2$ (anatase 15 nm) was added to this solution and stirred vigorously.

3 mL of 1 L of an aqueous solution containing 1450 mM of $Na^+$, 42 mM of $K^+$, 1410 mM of $Cl^-$, 80 mM of $HCO_3^{3-}$, and 95 mM of $HPO_4^-$ were added to solution 1 above (solution 2)

Process (2)

The solution to which water (50 mL) was immediately added was centrifuged for three minutes at 3000 rpm, and the supernatant was discarded.

The addition of the water and the centrifugation were repeated to remove the ions in the fluid.

(2) Results

The precipitated crystal was apatite having a rod shape the same as in Example 1 above.

Example 4

(1) Manufacturing Method

Process (1)

1 g of $TiO_2$ (anatase 15 nm) was added an aqueous solution 11 containing 1450 mM of $Na^+$, 42 mM of $K^+$, 1410 mM of $Cl^-$, 80 mM of $HCO_3^{3-}$, and 95 mM of $HPO_4^-$, and the product was mixed well (solution 2).

900 mg of $CaCl_2$ were dissolved in 1 mL of water (solution 1). This solution was added to solution 2 above.

Process (2)

The solution to which water (50 mL) was immediately added was centrifuged for three minutes at 3000 rpm, and the supernatant was discarded.

The addition of water and the centrifugation were repeated to remove the ions in the fluid.

The precipitated crystal was apatite having a rod shape the same as in Example 1 above.

Example 5

(1) Surface Area

The specific surface area was measured by a nitrogen gas absorption method. As a result, the specific surface area of the titanium dioxide used in the reference example and in Examples 1, 3, and 4 was 40.7 $m^2/g$.

The specific surface area of the material covering the apatite in the reference example was 42.8 $m^2/g$; 48.9 $m^2/g$ in the composite ceramic material of Example 1; 47.3 $m^2/g$ in the material of Example 3; and 45.7 $m^2/g$ in the material of Example 4; and it was apparent that the specific surface area had increased with respect to the reference example and that the surface area of the rod-shaped apatite thus precipitated was large.

(2) X-ray Diffraction Pattern of Powder

Figure 4:
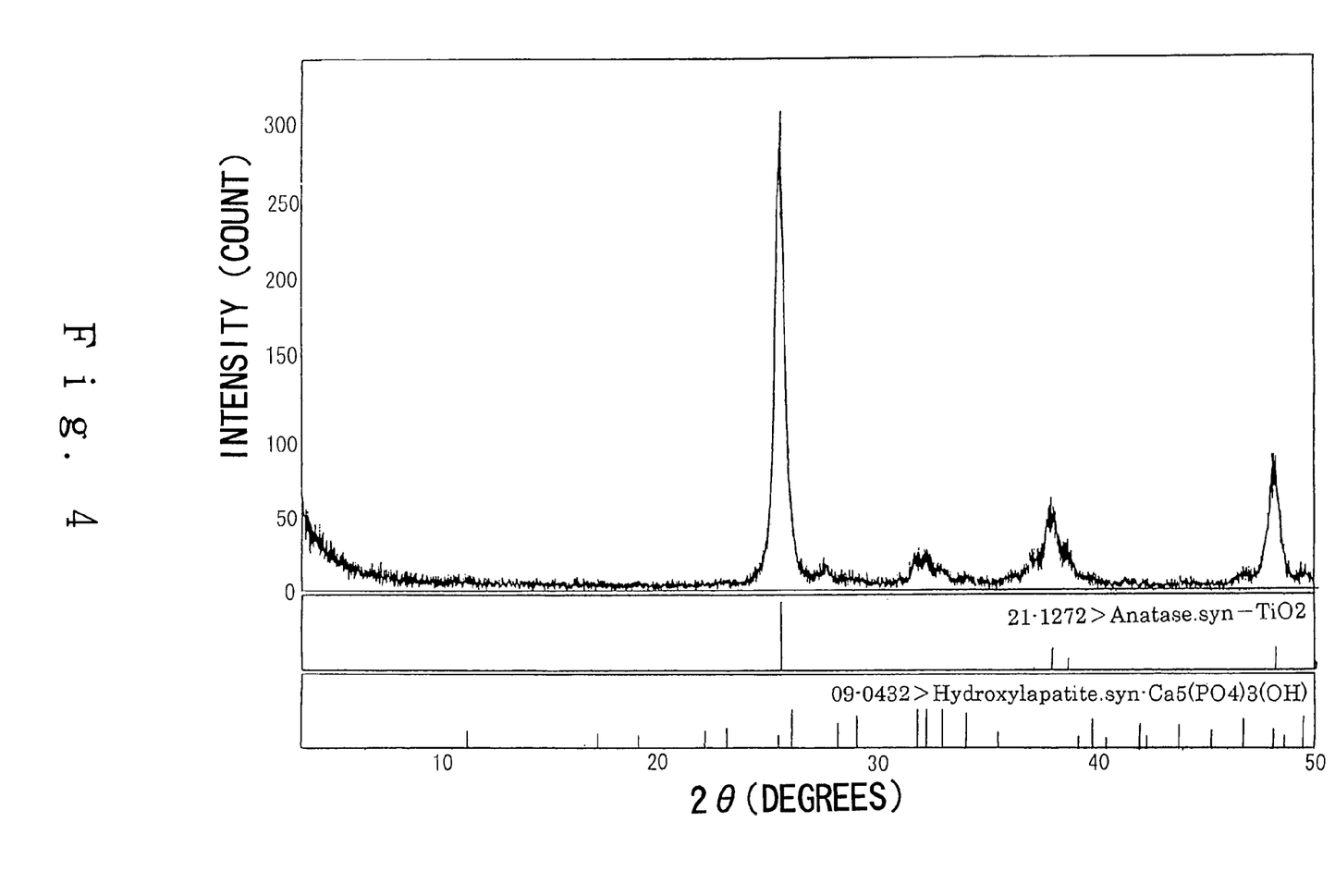
FIG. 4 shows the X-ray diffraction pattern of the powdered material of the reference example.
Figure 5:
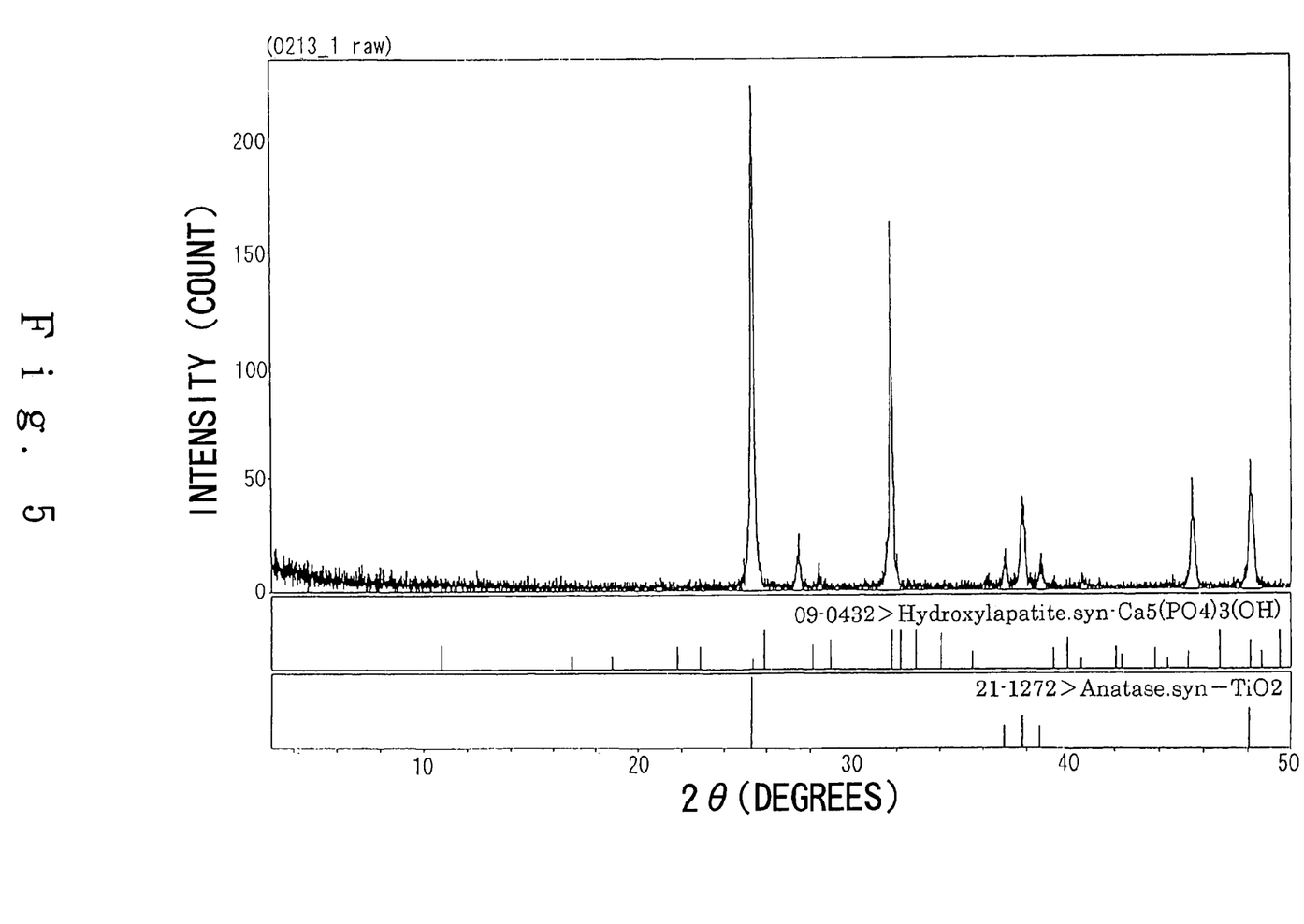
FIG. 5 shows the X-ray diffraction pattern of the powdered material of Example 2.
Figure 6:
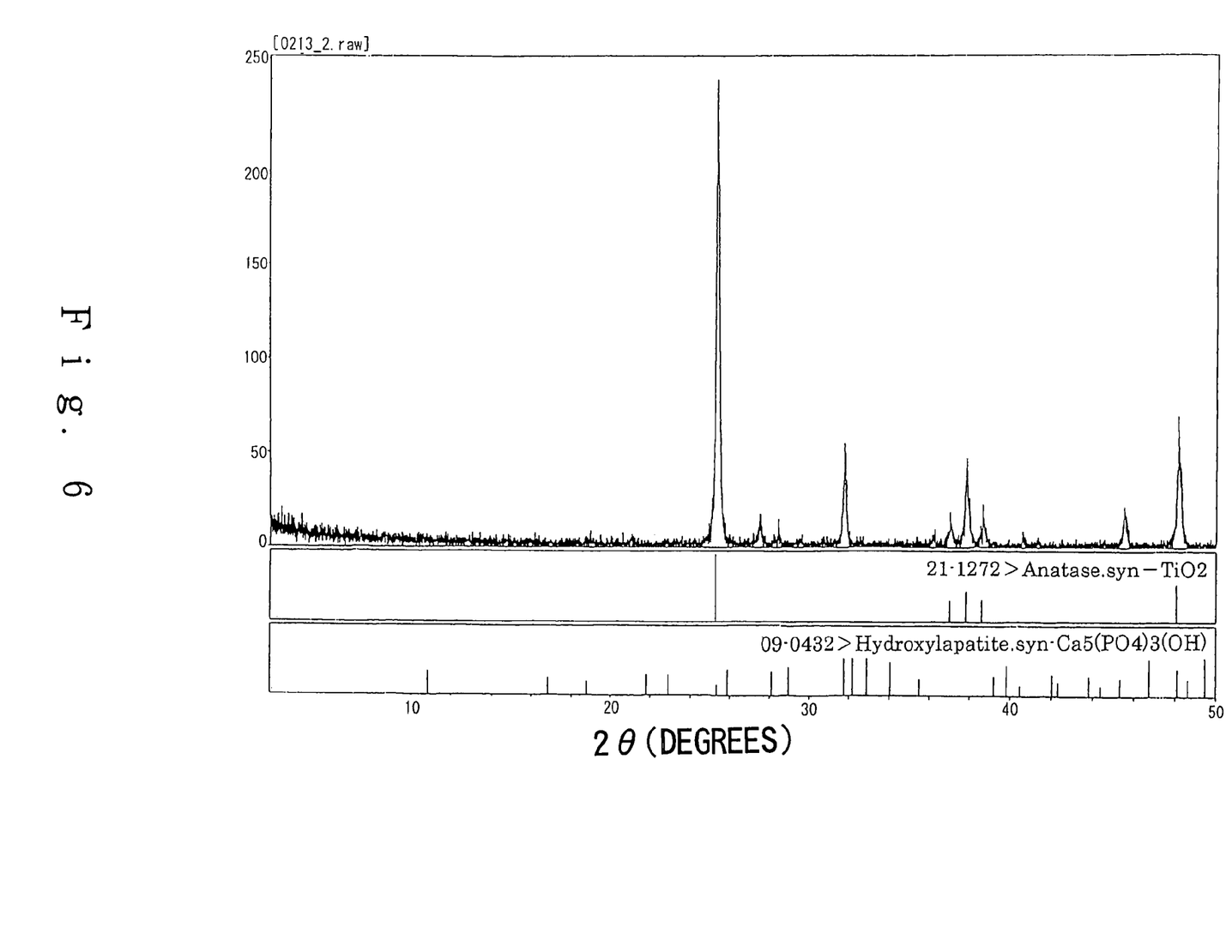
FIG. 6 shows the X-ray diffraction pattern of the powdered material of Example 3.

The X-ray diffraction patterns of the powders in the reference example and in Examples 2 and 3 are shown in FIGS. 4 through 6. Although small, a diffraction pattern in the vicinity of 31 degrees caused by the presence of apatite was observed in the reference example (FIG. 4). In contrast, an apatite pattern was clearly seen in Examples 2 and 3 (FIGS. 5 and 6), the pattern strength was high in comparison with the reference example, and it was apparent that apatite had been produced.

(3) Effects

The absorption decomposition properties for toluene, acetaldehyde, and ammonia were evaluated as described below. 1 g of powder of each material was placed in a 5-liter tetra bag, and 15 ppm of the abovementioned gas was placed therein. First, the concentration was measured in a test tube every ten minutes in a dark location shielded from light in order to investigate the absorption effects of the apatite. After 30 minutes, a black light (10 W) was caused to shine from a distance of 10 cm and concentration measurement was performed three times every ten minutes to investigate the decomposition effects by the photocatalyst. The results are shown in the tables.

TABLE 1

(toluene)

| | 10 minutes | 20 minutes | 30 minutes | 40 minutes | 50 minutes | 60 minutes |
|---|---|---|---|---|---|---|
| Titanium dioxide | 15 | 15 | 15 | 12 | 9 | 7 |
| Reference Example | 12 | 11 | 11 | 9 | 7 | 4 |
| Example 1 | 12 | 10 | 8 | 6 | 4 | 2 |
| Example 2 | 12 | 9 | 7 | 5 | 3 | 2 |
| Example 3 | 11 | 8 | 6 | 5 | 3 | 2 |

TABLE 2

(acetaldehyde)

| | 10 minutes | 20 minutes | 30 minutes | 40 minutes | 50 minutes | 60 minutes |
|---|---|---|---|---|---|---|
| Titanium dioxide | 15 | 15 | 15 | 11 | 7 | 5 |
| Reference Example | 11 | 10 | 11 | 9 | 6 | 3 |
| Example 1 | 10 | 8 | 6 | 4 | 2 | 1 |
| Example 2 | 9 | 7 | 5 | 4 | 3 | 2 |
| Example 3 | 8 | 7 | 5 | 4 | 3 | 2 |

TABLE 3

(ammonia)

| | 10 minutes | 20 minutes | 30 minutes | 40 minutes | 50 minutes | 60 minutes |
|---|---|---|---|---|---|---|
| Titanium dioxide | 15 | 15 | 15 | 12 | 9 | 7 |
| Reference Example | 11 | 10 | 10 | 9 | 7 | 4 |

TABLE 3-continued (ammonia)

|  | 10 minutes | 20 minutes | 30 minutes | 40 minutes | 50 minutes | 60 minutes |
|---|---|---|---|---|---|---|
| Example 1 | 10 | 8 | 6 | 5 | 4 | 2 |
| Example 2 | 10 | 8 | 7 | 4 | 3 | 2 |
| Example 3 | 10 | 8 | 6 | 5 | 3 | 2 |

The results clearly showed that the adsorbing effects of the apatite in the examples produced a reduction effect up to 30 minutes in the absence of light irradiation. Absorption by the apatite became saturated partway through the reference example, and reduction apparently stopped.

(4) Antimicrobial Effects 20 cc each of physiological saline were added to a slurry of pulverulent material in three test tubes to prepare a solution with a powder concentration of 0.05%, and the solution in one of the test tubes was used as a control.

A medium containing $1.8 \times 10^4$ CFU/mL of $C.\ coli$ was prepared, and the black light as a light source was caused to shine from a distance of 5 cm from the side. Solution was dripped 0.1 cc at a time onto the medium every two hours, and the concentration of microbes ($10^4$ CFU/mL) was measured. Air stirring was continued throughout the test. The results are shown in the table.

TABLE 4

|  | 0 hour | 2 hours | 4 hours |
|---|---|---|---|
| Titanium dioxide | 1.8 | 1.1 | 0.5 |
| Reference Example | 1.8 | 0.9 | 0.1 |
| Example 1 | 1.8 | 0.5 | 0 |
| Example 2 | 1.8 | 0.3 | 0 |
| Example 3 | 1.8 | 0.4 | 0.1 |

INDUSTRIAL APPLICABILITY

The present invention has specific effects as follows.

(1) A titanium dioxide composite photocatalytic material on which a compound composed of one or more apatite or other calcium phosphate monocrystals $Ca_9(PO_4)_6$ is partially deposited and which has photoactivity (photooxidation ability) and high adsorption capacity can be fabricated by a convenient operation.

(2) A large quantity of treatment is usually possible in a short time of approximately 1 to 10 seconds.

(3) Apatite or other calcium phosphate monocrystals can be fabricated having any shape and size.

(4) It is possible to fabricate a titanium dioxide photocatalyst composite on which rod-shaped or hexagonal columnar calcium phosphate monocrystal apatite is deposited and which has been unobtainable by the conventional method using artificial body fluid.

The invention claimed is:

1. A method for manufacturing a titanium dioxide composite ceramic material on which photoactive (photooxidative) apatite or another calcium phosphate monocrystals are partially deposited, said method comprising immersing titanium dioxide in an aqueous solution comprising an excess of phosphorus ions and calcium ions in comparison with an artificial body fluid, forming and aggregating calcium phosphate clusters and producing octacalcium phosphate, converting the octacalcium phosphate into an apatite or other calcium phosphate $Ca_9(PO_4)_6$ monocrystal, and then growing the monocrystal, to fabricate a titanium dioxide photocatalyst composite material on which a compound composed of one or more apatite or other calcium phosphate $Ca_9(PO_4)_6$ monocrystals is partially deposited, wherein the aqueous solution containing phosphorus ions and calcium ions comprises 200 to 3000 mM of $Na^+$, 30 to 80 mM of $K^+$, 60 to 2000 mM of $Ca^+$, 1 to 40 mM of $Mg^{2+}$, 150 to 3000 mM of $Cl^-$, 40 to 240 mM of $HCO^{3-}$, and 30 to 300 mM of $HPO_4^{2-}$.

2. The method according to claim 1, wherein the monocrystal is shaped as a rod or a hexagonal column.

3. The method according to claim 1, wherein the apatite or other calcium phosphate monocrystal having photooxidation ability is apatite having a size in the nanometer to submicron range.

4. The method according to claim 1, wherein a titanium dioxide photocatalyst composite material on which one or more units of $Ca_9(PO_4)_6$ having a specific surface area of 5 $m_2$/g are partially deposited is fabricated.

5. The method according to claim 1, wherein the apatite or other calcium phosphate monocrystal is elongated in direction of the c axis and has a maximum lattice interval of 8.2 Å±20%.

6. The method according to claim 1, wherein the shape and size of the monocrystal are controlled by adding a large quantity of water or alcohol to the aqueous solution, and controlling the progress of the reaction.

7. The method according to claim 1, wherein the exposed surface area of the titanium dioxide is 40% or higher.

8. A method for manufacturing a titanium dioxide composite ceramic material on which photoactive (photooxidative) apatite or another calcium phosphate monocrystals are partially deposited, said method comprising immersing titanium dioxide in an aqueous solution comprising an excess of phosphorus ions and calcium ions in comparison with an artificial body fluid, forming and aggregating calcium phosphate clusters and producing octacalcium phosphate, converting the octacalcium phosphate into an apatite or other calcium phosphate $Ca_9(PO_4)_6$ monocrystal, and then growing the monocrystal, to fabricate a titanium dioxide photocatalyst composite material on which a compound composed of one or more apatite or other calcium phosphate $Ca_9(PO_4)_6$ monocrystals is partially deposited, wherein the aqueous solution containing phosphorus ions and calcium ions comprises 30 to 80 mM of $K^+$, 60 to 2000 mM of $Ca^+$, 1 to 40 mM of $Mg^{2+}$, 150 to 3000 mM of $Cl^-$, 40 to 240 mM of $HCO^{3-}$, and 30 to 300 mM of $HPO_4^{2-}$.

9. The method according to claim 8, wherein the monocrystal is shaped as a rod or a hexagonal column.

10. The method according to claim 8, wherein the apatite or other calcium phosphate monocrystal having photooxidation ability is apatite having a size in the nanometer to submicron range.

11. The method according to claim 8, wherein a titanium dioxide photocatalyst composite material on which one or more units of $Ca_9(PO_4)_6$ having a specific surface area of 5 $m_2$/g are partially deposited is fabricated.

12. The method according to claim 8, wherein the apatite or other calcium phosphate monocrystal is elongated in direction of the c axis and has a maximum lattice interval of 8.2 Å±20%.

13. The method according to claim 8, wherein the shape and size of the monocrystal are controlled by adding a large quantity of water or alcohol to the aqueous solution, and controlling the progress of the reaction.

14. The method according to claim 8, wherein the exposed surface area of the titanium dioxide is 40% or higher.

15. The method according to claim 1 or 8, wherein the concentration of Ca ions in the aqueous solution is 200 to 1500 mM, and the concentration of P ions is 50 to 200 mM.

16. The method according to claim 1, or 8, wherein the aqueous solution comprises Zn, Fe, Ag, Ca, or Pt in a concentration of 0.1 µM or higher.

* * * * *